United States Patent [19]

Aoki et al.

[11] Patent Number: 5,114,801

[45] Date of Patent: May 19, 1992

[54] MAGNETIC RECORDING MEDIUM HAVING A MAGNETIC LAYER COMPRISING HEXAGONAL BARIUM FERRITE MAGNETIC PARTICLES CONTAINING TIN AND MAGNESIUM IN SPECIFIED PROPORTIONS

[75] Inventors: Nobuyuki Aoki; Keiichi Ochiai; Hideaki Komoda, all of Hirakata, Japan

[73] Assignee: Matsushita Electric Industrial Co., Ltd., Osaka, Japan

[21] Appl. No.: 571,093

[22] Filed: Aug. 21, 1990

[30] Foreign Application Priority Data

Aug. 21, 1989 [JP] Japan .................................. 1-214490
Mar. 30, 1990 [JP] Japan .................................. 2-86539

[51] Int. Cl.$^5$ .............................................. G11B 5/00
[52] U.S. Cl. ...................... 428/694; 428/900; 252/62.51
[58] Field of Search .................. 428/694, 900, 402; 252/62.51

[56] References Cited

U.S. PATENT DOCUMENTS 3,023,166  2/1962  Duinker et al. ................... 252/62.5
4,770,933  9/1988  Kitahata et al. ..................... 428/323
4,820,433  4/1989  Yamamoto ....................... 252/62.57

OTHER PUBLICATIONS

Kubo et al., "IEEE Trans. Mag.", vol. Mag-18(6), 1122–1124 (1982).

Primary Examiner—Merrell C. Cashion, Jr.
Assistant Examiner—Steven A. Resan
Attorney, Agent, or Firm—Wenderoth, Lind & Ponack

[57] ABSTRACT

Disclosed herein is a magnetic recording medium having a magnetic layer comprising hexagonal ferrite magnetic particles each expressed as $BaO \cdot Fe_{12-x-y}Sn_xMg_yO_{18}$ (where, $0.55 \leq x \leq 0.88$, $0.71 \leq y \leq 1.05$). The hexagonal ferrite magnetic particles contained in this magnetic layer each have Sn and Mg partially substituted for Fe, the Sn and Mg being perfectly solid-soluble, thus being capable of providing hexagonal ferrite magnetic particles which are superior in crystalline properties and small in variation of composition. As a result, the coercivity distribution can be made further sensitive, both the self demagnetization and recording demagnetization in the short wave-length range can be reduced, and a higher reproducing output characteristic is attainable in the high density recording range.

6 Claims, 3 Drawing Sheets

FIG. 1b
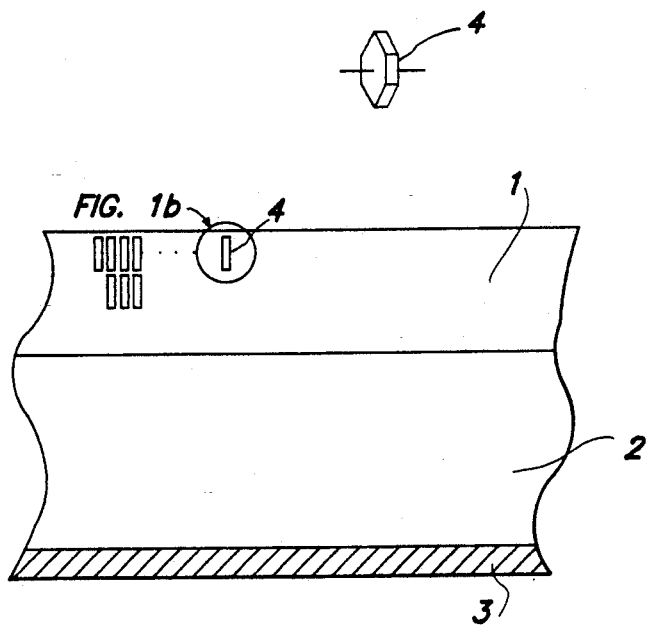
FIG. 1a
FIG. 2b
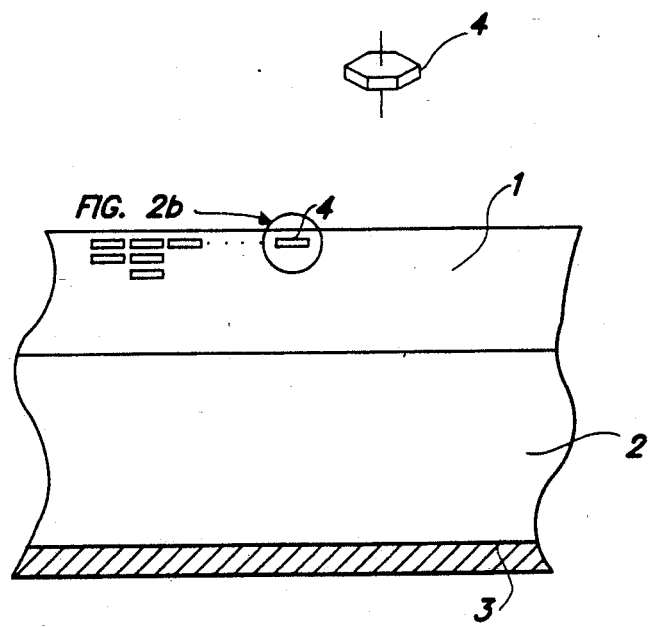
FIG. 2a

MAGNETIC RECORDING MEDIUM HAVING A MAGNETIC LAYER COMPRISING HEXAGONAL BARIUM FERRITE MAGNETIC PARTICLES CONTAINING TIN AND MAGNESIUM IN SPECIFIED PROPORTIONS

BACKGROUND OF THE INVENTION

1. Field of the Invention

This invention relates to a high density magnetic recording medium and more particularly, to a magnetic recording medium adapted to be used for tapes for digital VTR or HD-VTR as well as for a large capacity floppy disk or the like.

2. Description of the Prior Art

Magnetic recording of information on a magnetic recording medium is generally effected by using the magnetization of magnetic particles in the longitudinal direction of the magnetic recording medium. With such method shown above, however, it is difficult to improve the recording density as to exceed a limited level because high densification of recording may result in an increase in the demagnetization of the recording medium.

Under such circumstances in order to exceed such a limited level on the recording density, a perpendicular magnetic recording method has been proposed recently, which uses the magnetization of magnetic particles in the perpendicular direction to the surface of the recording medium (see, for example, Shunichi Iwasaki; "High Density Magnetic Recording Using Perpendicular Magnetization", Nikkei Electronics, Aug. 7, 1978, pp 100–111). The above-mentioned perpendicular magnetic recording method features that the demagnetization in a recording medium is decreased in the high density recording range, so that it can be said to be a method substantially adapted to be used for high density recording.

As the recording medium used for the perpendicular magnetic recording method, there may be a continuous film such as Co-Cr evaporation film or the like and a coated film having plate-like hexagonal barium ferrite particles or the like dispersed in a resin (see, for example, Japanese Patent Application Laid-Open Nos. 60-149105 and 1-251420). Particularly, the coated film type of perpendicular magnetic recording medium has been watched with a keen interest from the practical viewpoints of, for example, the cost-effectiveness and durability (see, for example, O. Kubo, T. Ido and H. Yokoyama, IEEE Trans. Magn., MAG-18(6), P 1122 (1982)). With the coated film type of perpendicular magnetic recording medium, plate-like magnetic particles to be dispersed each has the easy-axis of magnetization in the perpendicular direction to the plate surface thereof. As a result, plate-like magnetic particles whose easy-axis of magnetization is easy to orient in the perpendicular direction to the supporting base body in coating process are employed. However, even if an easy-to-orient magnetic powder is used, suitable orientation can not be attained only by coating them on a base film using a general method, which means that it is difficult to obtain a perfect perpendicular magnetic recording medium. On the other hand, barium ferrite magnetic particles are extremely fine and plate-like in shape with a thickness of 100 to 1,000 angstroms, which means that these particles may be advantageously used as a longitudinal orientation medium.

In order to improve the recording characteristics of a magnetic recording medium in the short wave-length range, many attempts have been made to make the surface roughness thereof small in the allowable practical property range as well so as to make the residual magnetization of the recording medium large.

With hexagonal ferrite magnetic particles such as the above-mentioned barium ferrite, however, it is well-known that their saturation magnetization is small, which means that a limitation will be naturally imposed upon the improvement of their magnetization value. As a result, in order to improve the magnetization of a magnetic recording medium, an attempt has been made to use finer magnetic particles to increase the packing density, or the magnetic particles per unit volume, has been made as one of means for this purpose. In this case, however, an increase in packing density makes it possible to improve the magnetization thereof up to a certain level of range, but results in the deterioration of the surface roughness of the recording medium. Furthermore, extremely fine magnetic particles results in decreasing the dispersivity of magnetic particles in a magnetic paint. There arise problems as above to be overcome. In addition, as the hexagonal ferrite powder to be used for the magnetic recording application, that with Co-Ti substitution is generally well-known, which results in an increase in coercivity distribution, so that when it is used as a recording medium, the transition length of recording becomes large, which is disadvantageous.

As described above, a conventional magnetic recording medium has had a limitation upon the improvement of its output property in the high density recording range.

SUMMARY OF THE INVENTION

In order to solve the above-mentioned problems, an object of this invention is to provide a magnetic recording medium which is small in self-demagnetization and recording demagnetization in the short wave-length range and superior in recording characteristics in the high density recording range.

In order to attain the above-mentioned object, a magnetic recording medium of this invention has a magnetic layer comprising hexagonal ferrite magnetic particles each expressed as $BaO.Fe_{12-x-y}Sn_xMg_yO_{18}$ (where, $0.55 \leq x \leq 0.88$ and $0.71 \leq y \leq 1.05$). The magnetic powder in the magnetic layer is prepared by using the co-precipitation process with alkali salts and the firing process in combination. The co-precipitate of each salt is made ferritic by the liquid-phase reaction with NaCl as a flux and finally, by rinsing the NaCl with water, the objective magnetic particles can be prepared. In this case, both Sn and Mg elements partially substitute for Fe and are perfectly solid-soluble into each of the magnetic particles thus prepared, thus being capable of obtaining a good crystalline properties and a small variation in composition between magnetic particles. As a result, more sensitive coercivity distribution is obtainable and a higher reproducing output characteristic is attainable in the high density recording range.

As explained above, with the conventional magnetic recording medium, the coercivity distribution becomes wide and the transition length of recording in high density recording range becomes large, and the recording characteristics are not very good as generally evaluated. However, a magnetic recording medium of this invention has a magnetic layer containing hexagonal ferrite magnetic particles each expressed as: $BaO\cdot Fe_{12-x-y}Sn_xMg_yO_{18}$ (where, $0.55 \leq x \leq 0.88$, $0.71 \leq y \leq 1.05$), and the Sn and Mg elements which are respectively non-magnetic are substitutionally introduced with the Fe element into each of the hexagonal ferrite particles, so that the coercivity distribution of the magnetic recording medium can be greatly improved. This is considered because the substitutional introduction of an element with the Fe element into the crystalline structure of magnetic particles, which is difficult to achieve in case that barium ferrite powder is used for the magnetic recording purpose in accordance with the prior art can be achieved effectively by using Sn and Mg in combination, and because with a tape-like magnetic recording medium, the easy-axis of magnetization of the medium can be oriented in the longitudinal direction of the recording medium vectorially at a higher order. Accordingly, the recording characteristics of the magnetic recording medium in the short wave-length range, or at the high density recording level, can be greatly improved.

BRIEF DESCRIPTION OF THE DRAWINGS

FIG. 1 is a cross-sectional view of a tape-like magnetic recording medium according to an embodiment of this invention, in which the easy-axis of magnetization thereof is in the longitudinal direction of the recording medium;

FIG. 2 is a cross-sectional view of a magnetic recording medium according to another embodiment of this invention, in which the easy-axis of magnetization thereof is in the thickness direction of the recording medium;

DESCRIPTION OF THE PREFERRED EMBODIMENTS

Figure 3:
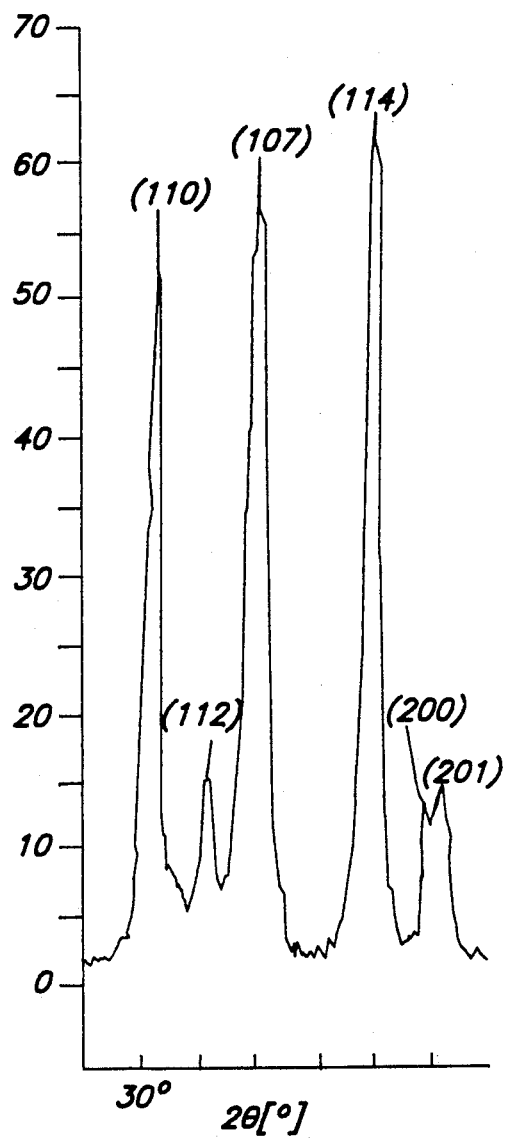
FIG. 3 shows an X-ray diffraction pattern of a magnetic powder used for a magnetic recording medium according to the embodiments of this invention.

FIG. 1 cross-sectionally shows a tape-like magnetic recording medium of an embodiment of this invention, in which the recording medium has its easy-axis of magnetization in the direction longitudinally thereof. In FIG. 1, the reference numeral 1 indicates a magnetic layer, 2 does a non-magnetic base film, 3 a back-coated layer and 4 a hexagonal plate-like magnetic particle which has the easy-axis of magnetization in the direction perpendicular to the plate-like surface thereof and is oriented so that the plate-like surface thereof can be in the longitudinal direction of the tape-like recording medium. In FIG. 1, the easy-axis of magnetization of the magnetic particle 4 is shown by the arrow.

FIG. 2 cross-sectionally shows a magnetic recording medium according to another embodiment of this invention, in which the recording medium has the easy-axis of magnetization in the thickness direction thereof. In which, the hexagonal plate-like magnetic particle 4* has its easy-axis of magnetization in the direction perpendicular to the plate-like surface thereof and is oriented so that the plate-like surface thereof can be in the thickness direction of the recording medium.

Figure 4:
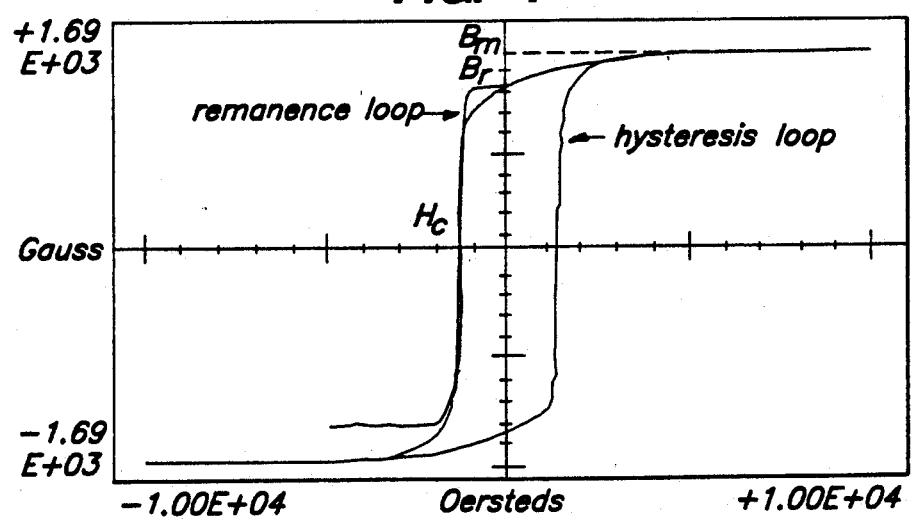
FIG. 4 shows a magnetization curve in the direction of a magnetic recording medium according to the embodiments of this invention.
Figure 5:
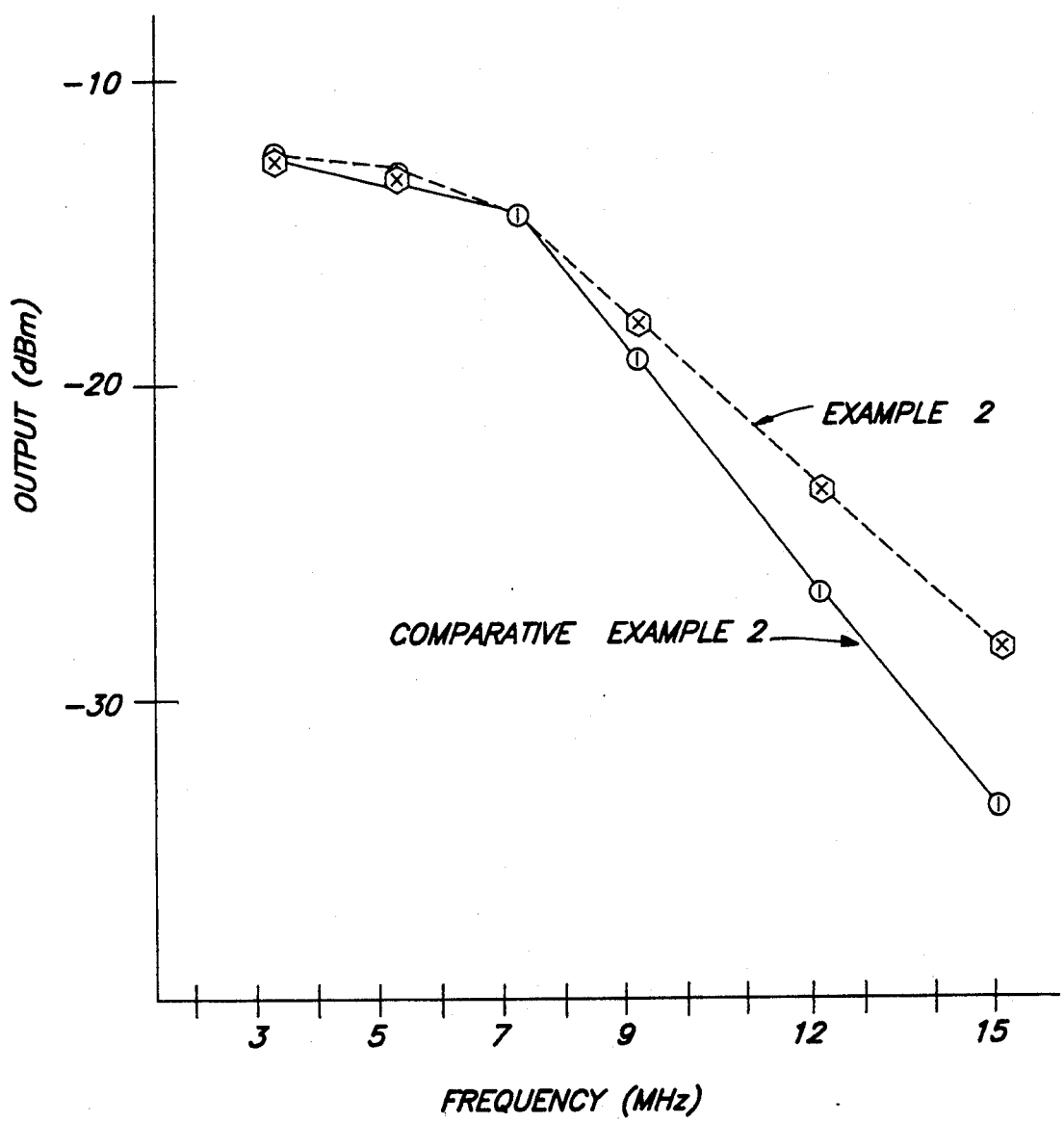
FIG. 5 shows output frequency characteristic curves of a magnetic recording medium according to the embodiments of this invention.

FIG. 3 shows an X-ray diffraction pattern of a magnetic powder used for a magnetic recording medium according to the embodiments of this invention. In which, each peak of diffraction is sharp, clearly showing that the magnetic particle is superior in crystalline property. The diffraction pattern of a magnetic particle is preferably sharpened as shown in FIG. 3 in that the crystalline property of the magnetic particle obtained has a large effect particularly on the sensitivity of coercivity distribution. In addition, FIG. 4 shows a magnetization curve in the direction of a tape-like magnetic recording medium according to the embodiments of this invention. In which, the second quadrant, where the hysteresis characteristic of the magnetization curve from the residual magnetization component Br to the coercivity Hc is shown, indicates one of parameters showing good high density recording characteristics. In FIG. 4, it is clearly shown that reduction of the magnetization component from the residual magnetization component Br is small and the magnetization invention at a point of the coercivity Hc is extremely sharp. This means that the magnetic recording medium of this invention becomes a medium having very small self demagnetization and recording demagnetization as the recording wave-length becomes small, thus being capable of providing superior recording characteristics in the high density recording range.

EXAMPLE 1

The following materials were mixed and dispersed using a kneader and grind mill to prepare a magnetic coating material to be used for EXAMPLE 1;

In this case, the magnetic powder to be used was of powdered barium ferrite expressed as $BaO\cdot Fe_{10.53}Sn_{0.65}Mg_{0.82}O_{18}$.

| | |
|---|---|
| *Mg—Sn substituted barium ferrite particles (average plate diameter = 0.05 μm, aspect ratio (diameter/thickness) = 3.5, coercivity = 9000e) | 100 parts |
| *Vinyl chloride copolymer | 7 parts |
| *Polyurethane | 7 parts |
| *Solvent | |
| MIBK    1 | |
| Toluene    1 | 278 parts |
| Cychlohexanone    1 | |

The magnetic coating material thus prepared was subjected to the addition of a lubricant and curing agent respectively at predetermined amounts while agitating, then coated on the surface of a tape-like base film at a coating rate of about 30 m/min. using a die coater, and passed through the gap between orientation magnets having a magnetic field generated in the some direction that the tape-like base film is to be run. Thereafter, the tape-like magnetic recording medium thus passed therethrough was dried for curing. Thus, a magnetic layer of EXAMPLE 1 was obtained.

EXAMPLE 2

Magnetic paint prepared in the same way as in EXAMPLE 1 was subjected to the addition of a lubricant and curing agent respectively at predetermined amounts while agitating, then coated on the surface of a tape-like base body at a coating rate of about 30 m/min. using a die coater, and passed between opposed magnetic poles in order to magnetize the magnetic particles thus coated in the direction perpendicular to the running direction of the supporting base film. Thereafter, the tape-like magnetic recording medium thus passed therebetween was dried for curing. Thus, a magnetic layer of EXAMPLE 2 was obtained.

EXAMPLE 3

Magnetic layer of EXAMPLE 3 was obtained in the same way as in EXAMPLE 1 except that powdered barium ferrite expressed as $BaO.Fe_{10.50}Sn_{0.75}Mg_{0.75}O_{18}$ was used as a magnetic powder for preparing the magnetic paint.

EXAMPLE 4

Magnetic layer of EXAMPLE 4 was obtained in the same way as in EXAMPLE 2 except that the same magnetic powder as in EXAMPLE 3 was used for preparing the magnetic paint.

EXAMPLE 5

Magnetic layer was obtained in the same way as in EXAMPLE 1 except that powdered barium ferrite expressed as $BaO.Fe_{10.36}Sn_{0.82}Mg_{0.82}O_{18}$ was used as a magnetic powder for preparing the magnetic paint.

EXAMPLE 6

Magnetic layer of EXAMPLE 6 was obtained in the same way as in EXAMPLE 2 except that the same magnetic powder as in EXAMPLE 5 was used for preparing the magnetic paint.

EXAMPLE 7

Magnetic layer of EXAMPLE 7 was obtained in the same way as in EXAMPLE 1 except that powdered barium ferrite expressed as $BaO.Fe_{10.74}Sn_{0.55}Mg_{0.71}O_{18}$ was used for preparing the magnetic paint.

COMPARATIVE EXAMPLE 1

In the same procedures as in EXAMPLE 1, the following materials were mixed and dispersed using a keader and grind mill to prepare a magnetic paint to be used for COMPARATIVE EXAMPLE 1;

In this case, the magnetic powder was of powdered barium ferrite expressed as $BaO.Fe_{10.5}(Co-Ti)_{0.75}O_{18}$, which was prepared by substituting a part of Fe of the powdered barium ferrite with Co-Ti. Other procedures were in accordance with the procedures shown in EXAMPLE 1 as follows;

| | | |
|---|---|---|
| *Co—Ti substituted barium ferrite particles (average plate diameter = 0.05 μm, aspect ratio (diameter/thickness) = 3.5, coercivity = 9000e) | | 100 parts |
| *Vinyl chloride copolymer | | 7 parts |
| *Polyurethane | | 7 parts |
| *Solvent | | |
| MIBK | 1 | |
| Toluene | 1 | 278 parts |
| Cychlohexanone | 1 | |

The magnetic paint thus prepared was subjected to the addition of a lubricant and curing agent respectively at predetermined amounts while agitating, then coated on the surface of a tape-like base film at a coating rate of about 30 m/min. using a die coater, and passed through the gap between orientation magnets having a magnetic flux in the same direction that the tape-like base film is to be run, followed by drying to cure. Thus, a magnetic layer of COMPARATIVE EXAMPLE 1 was obtained.

COMPARATIVE EXAMPLE 2

In COMPARATIVE EXAMPLE 2, the same magnetic paint as to be used in COMPARATIVE EXAMPLE 1 was used and coated on the surface of a tape-like base film in the same procedures as in EXAMPLE 2. Thus, a magnetic layer having the easy-axis of magnetization in the thickness direction of the base film of COMPARATIVE EXAMPLE 2 was obtained.

COMPARATIVE EXAMPLE 3

In COMPARATIVE EXAMPLE 3, powdered barium ferrite expressed as $BaO.Fe_{11.20}Sn_{0.40}Mg_{0.40}O_{18}$ was used as a magnetic paint and other procedures were the same as in COMPARATIVE EXAMPLE 1 thereby obtaining a magnetic layer of COMPARATIVE EXAMPLE 3.

COMPARATIVE EXAMPLE 4

In COMPARATIVE EXAMPLE 4, powdered barium ferrite expressed as $BaO.Fe_{9.80}Sn_{1.10}Mg_{1.10}O_{18}$ was used as a magnetic paint and other procedures were the same as in COMPARATIVE EXAMPLE 1 thereby obtaining a magnetic layer of COMPARATIVE EXAMPLE 4.

Surface roughnesses of magnetic layers thus obtained for EXAMPLE and COMPARATIVE EXAMPLEs were evaluated using a three dimensional non-contact surface roughness tester produced by WYKO Coporation. In addition, magnetic chracteristics of these magnetic layers were measured using a vibrating-sample magnetometer and digitally analyzed the data thus measured in detail. Further, the samples of these magnetic recording media were slitted at a width of ½ inches and electromagnetic conversion properties of the magnetic layers coated on these samples were measured using a modified SVHS deck, which were carried out by measuring the electromagnetic conversion property at each of recording frequency points of 7, 9, 12 and 15 MHzs at a relative velocity of 5.8 m/sec using a laminated amorphous head with a track width of 20 microns and a gap length of 0.22 microns. In Tab. 1, the squareness ratio, SFD, S*, Hk and output characteristic of each sample of magnetic recording media are shown. In this regard S* is defined as a ratio of the value at the intersection of the tangent of the magnetization curve at a coercivity of Hc and the tangent thereof at a flux density of Bm and the coercivity Hc, and as this value of S* approaches one (1), the recording demagnetization becomes small, meaning it is capable of providing a good recording medium. As a result, the dispersivity of the magnetic particles of EXAMPLEs 1 to 7 was improved and the surface roughness of each magnetic recording sample obtained was improved as well. Also, in these EXAMPLEs, the SFD (Switching magnetic Field Distribution) values were small and S* (coercivity squareness) values were superior in squareness, showing that these samples can provide a good high density recording property. In the cases of EXAMPLEs 2, 4 and 6 and COMPARATIVE EXAMPLE 2, which are samples each having orientation of magnetic particles in the thickness direction of a recording medium, the values of SFD and S* were omitted. The fact that samples of EXAMPLEs 2, 4 and 6 were superior in high density recording property is considered to be due to the effects of uniaxial anisotropy and the perpendicular magnetization component.

TABLE 1

| Sample | ∥ or ⊥ Sr(—) | ∥ SFD & S* | Hk(Oe) | Recording frequency (MHz) | | | |
|---|---|---|---|---|---|---|---|
| | | | | 7 | 9 | 12 | 15 |
| EXAMPLE 1 | 0.82 | 0.09/0.96 | 2,600 | +0.8 | +1.1 | +1.4 | +2.9 |
| EXAMPLE 2 | 0.81 | — | 2,600 | +0.1 | +1.2 | +3.4 | +5.2 |
| EXAMPLE 3 | 0.78 | 0.16/0.94 | 2,450 | +0.5 | +0.9 | +1.3 | +2.8 |
| EXAMPLE 4 | 0.79 | — | 2,450 | +0.6 | +1.7 | +3.6 | +5.4 |
| EXAMPLE 5 | 0.85 | 0.08/0.97 | 2,200 | +1.2 | +1.3 | +1.4 | +2.3 |
| EXAMPLE 6 | 0.81 | — | 2,200 | +0.6 | +1.0 | +2.8 | +4.4 |
| EXAMPLE 7 | 0.79 | 0.13/0.95 | 2,510 | +1.5 | +1.8 | +2.9 | +3.7 |
| COMPARATIVE EXAMPLE 1 | 0.78 | 0.29/0.76 | 5,500 | −0.4 | −0.7 | −1.5 | −1.9 |
| COMPARATIVE EXAMPLE 2 | 0.79 | — | 5,500 | 0 | 0 | 0 | 0 |
| COMPARATIVE EXAMPLE 3 | 0.78 | 0.33/0.83 | 3,800 | −1.8 | −1.1 | −0.8 | −0.5 |
| COMPARATIVE EXAMPLE 4 | 0.75 | 0.31/0.81 | 1,400 | −0.9 | −1.8 | −2.4 | −2.8 |

On the other hand, in COMPARATIVE EXAMPLEs 1 and 2, the use of conventional magnetic particles made impossible to obtain a suitable dispersion of them regardless of the direction of orientation to the magnetic recording medium, and the surface roughness was deteriorated and both the SFD and S* values became unsatisfactory. In addition, in the case where contents of Sn and Mg were respectively larger than predetermined values, both the coercivity (Hc) and the saturation magnetization were small, the recording demagnetization was large and the output in the short wavelength range was low. Contrary to this, in case where the contents of Sn and Mg were respectively smaller than predetermined values, a sufficient recording could not be achieved with the head that was used, resulting in a low output in the short wave-length range.

As seen from the above description, samples of EXAMPLEs 1 to 7 using magnetic particles in accordance with this invention make it possible to improve the surface roughness which contributes to increase the output in the short wavelength range as well as to improve the SFD value and S* value at a higher level as compared with COMPARATIVE EXAMPLEs 1 to 4 not using the magnetic particles of this invention. In this case, there is no limitation upon the orientation mode; if uniaxially anisotropic, it can be used as a magnetic powder of this invention, preferably oriented longitudinally to a recording medium, further preferably oriented perpendicular to the surface of the same.

As described above, a magnetic recording medium in accordance with this invention makes it possible to provide an improved surface roughness of the surface of the magnetic recording medium as well as to attain a low SFD value and high S* value at a high level. As a result, this invention makes it possible to provide a magnetic recording medium having an extremely narrow magnetization transition range and sharp magnetization inversion suitable to record an information at a high density, thus being capable of achieving a high density recording performance.

What is claimed is:

1. A magnetic recording medium having a magnetic layer comprising hexagonal ferrite magnetic particles each consisting of $BaO \cdot Fe_{12-x-y}Sn_xMg_yO_{18}$ where, $0.55 \leq x \leq 0.88$, $0.71 \leq y \leq 1.05$.

2. The magnetic recording medium as claimed in claim 1, wherein said hexagonal ferrite magnetic particles are oriented so that said magnetic layer can be always provided with a residual magnetization in a direction of an applied magnetic field.

3. The magnetic recording medium as claimed in claim 1, having a tape-like shape and an easy-axis of magnetization in the longitudinal direction of the same.

4. The magnetic recording medium as claimed in claim 1, having an easy-axis of magnetization in the thickness direction of the same.

5. The magnetic recording medium as claimed in claim 1, having a coercivity ranging from 500 to 1,700 Oe.

6. The magnetic recording medium as claimed in claim 1, having an anisotropy field of 3,000 Oe or less.

* * * * *